Dec. 4, 1956

R. L. BRIGHT 2,773,132

MAGNETIC AMPLIFIER

Filed June 2, 1954

WITNESSES

Edwin E. Bassler

Kenneth W. Thomas

INVENTOR

Richard L. Bright

BY Ezra W. Savage

ATTORNEY

United States Patent Office 2,773,132

Patented Dec. 4, 1956

2,773,132

MAGNETIC AMPLIFIER

Richard L. Bright, Adamsburg, Pa., assignor to Westinghouse Electric Corporation, East Pittsburgh, Pa., a corporation of Pennsylvania Application June 2, 1954, Serial No. 433,876

2 Claims. (Cl. 179—171)

This invention relates to magnetic amplifiers, and more particularly to self-saturating magnetic amplifiers which utilize one or more transistors as control components.

In many applications, it is desirable to utilize a static type of amplifier, such as a self-saturating magnetic amplifier. However, prior art self-saturating magnetic amplifiers have certain limitations. For instance, these prior art self-saturating magnetic amplifiers are not capable of properly amplifying extremely low level power signals. The reason for this is that the means heretofore used for producing self-saturation in the self-saturating magnetic amplifier is incapable of properly rectifying supply voltage signals of low amplitude. Such being the case, in these prior art magnetic amplifiers, it is necessary to provide relatively large magnetic core members. Otherwise, if the core member were not sufficiently large, the supply voltage of relatively large amplitude would effect a saturation of the magnetic core member during the complete cycle of operation and, thus, prevent the control voltage from effecting a resetting of the flux level in the magnetic core member. Since it is necessary in these prior art self-saturating magnetic amplifiers to provide a relatively large magnetic core member, the control signal must also be of relatively high power level in order to effect a resetting of the flux level in the magnetic core member over a suitable range of operation. Further, the response time of the magnetic amplifier is increased with an increase in the size of the magnetic core member. Thus, owing to the limitations of the means for producing self-saturation in these prior art self-saturating magnetic amplifiers, the magnetic amplifiers are incapable of amplifying low level power signals.

An object of this invention is to provide a self-saturating magnetic amplifier for amplifying extremely low power level control signals, by utilizing in combination in a predetermined manner, as the means for effecting self-saturation, a transistor which is so connected as to sychronously rectify an alternating-current supply voltage of small amplitude.

Another object of this invention is to provide for so controlling a transistor within a self-saturating magnetic amplifier that the transistor has a minimum of leakage at cutoff and a minimum of forward voltage drop, to thereby enable the magnetic amplifier to properly operate at a relatively high ambient temperature.

Other objects of this invention will become apparent from the following description when taken in conjunction with the accompanying drawing, in which.

Figure 1:
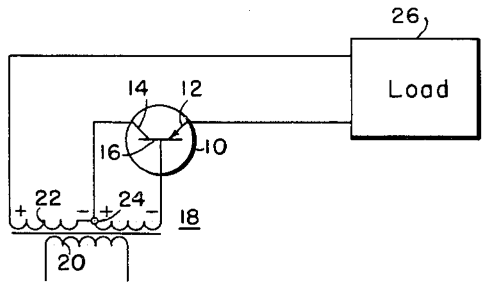
Figure 1 is a schematic diagram of a PNP transistor whose electrodes have applied thereto synchronous voltages in order that the transistor functions as a switch.

Referring to Fig. 1, there is illustrated a PNP transistor 10, comprising a semiconductive body having an emitter electrode 12, a collector electrode 14, and a base electrode 16, all in operative contact with the semiconductive body. By synchronously applying two voltages to the electrodes 12, 14 and 16 of the transistor 10, and applying these voltages in a particular manner, the transistor 10 functions as a switch. In addition to functioning as a switch, the transistor 10 also is capable of synchronously rectifying alternating-current voltages of extremely low amplitude when the synchronous voltages are applied to the transistor 10 in a manner as will be explained more fully hereinafter. Further, when the synchronous voltages are applied to the transistor 10, in the manner illustrated, the transistor 10 is capable of properly operating at a relatively high ambient temperature.

As illustrated, the means for applying the synchronous voltage to the transistor 10 comprises a potential transformer 18 having a primary winding 20, which is energized from an alternating-current source (not shown), and a secondary winding 22 having a tap 24. In order to apply a voltage between the emitter electrode 12 and the collector electrode 14, the left end of the secondary winding 22, as illustrated, is connected through a load 26, to the emitter electrode 12, the collector electrode 14 being connected to the tap 24 of the secondary winding 22. On the other hand, in order to apply a voltage between the base electrode 16 and the collector electrode 14, the right end of the secondary winding 22, as illustrated, is connected to the base electrode 16, and the tap 24 of the secondary winding 22 is connected to the collector electrode 14.

It is to be noted that the transformer 18 is such that when the emitter electrode 12 is positive with respect to the collector electrode 14, the collector electrode 14 is positive with respect to the base electrode 16. By so applying the voltages, appearing across the secondary winding 22, to the transistor 10 during this half-cycle of the operation, a minimum of forward voltage drop and a maximum of power current handling capacity is obtained for the transistor 10. Thus, during this half-cycle of the operation current flows from the left end of the secondary winding 22, as illustrated, through the load 12, and the emitter and collector electrodes 12 and 14, to the tap 24 of the secondary winding 22.

On the other hand, during the next half-cycle of the operation, when the voltage across the primary winding 20 of the transformer 18 has reversed, the base electrode 16 is positive with respect to the collector electrode 14 and with respect to the emitter electrode 12. When the voltages, appearing across the secondary winding 22, are so applied to the transistor 10, the transistor 10 is rendered non-conductive and has a minimum of leakage current in this cutoff position. Therefore, since the transister 10 can be operated so as to have a minimum of leakage at cutoff and a minimum of forward voltage drop and a maximum of power current handling capacity when in the conductive state, the transistor 10 can be operated properly at a relatively high ambient temperature. Also, as was mentioned before, when synchronous voltages are applied to the transistor 10, as described above, the transistor 10 is capable of synchronously rectifying voltages of relatively low amplitude.

Figure 2:
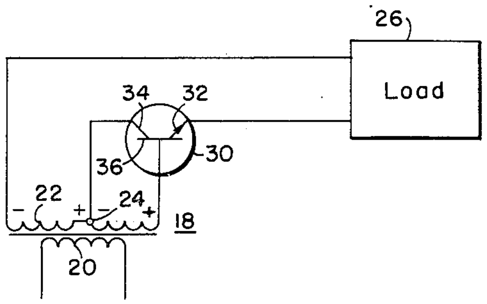
Fig. 2 is a schematic diagram of an NPN transistor whose electrodes have applied thereto synchronous voltages in order that the transistor functions as a switch.

Referring to Fig. 2, there is illustrated an NPN transistor 30 comprising a semiconductive body having an emitter electrode 32, a collector electrode 34, and a base electrode 36, all in operative contact with the semiconductive body. In order to simplify the description, like components in Figs. 1 and 2 have been given the same reference characters. The main distinction between the apparatus of Figs. 1 and 2 is that in the apparatus of Fig. 2, the NPN transistor 30 has been substituted for the PNP transistor 10 of Fig. 1; however, both of these transistors have synchronous voltages applied thereto in order that they might function as switches.

It is to be noted that in Fig. 2, the transistor 30 is conductive when the right end of the secondary winding 22, as illustrated, is at a positive polarity with respect to its left end; however, in the apparatus of Fig. 1, the transistor 10 is conductive when the left end of the secondary winding 22, as illustrated, is at a positive polarity with respect to its right end. Otherwise, the synchronous voltages are applied to the transistor 30 in substantially the same manner as they are applied to the transistor 10 of Fig. 1. Since the remaining operation of the apparatus of Fig. 2 is similar to the operation of the apparatus of Fig. 1, a further description of such operation is deemed unnecessary. Of course, the apparatus of Fig. 2 has the same advantages as were described with reference to the apparatus of Fig. 1.

Figure 3:
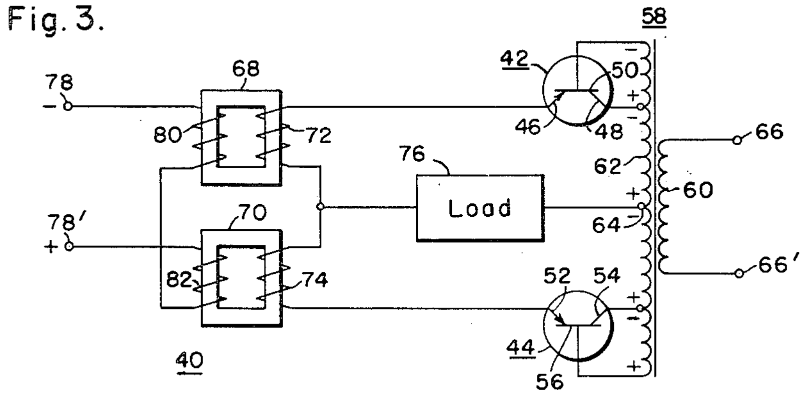
Fig. 3 is a schematic diagram of a self-saturating magnetic amplifier which has incorporated therein a plurality of transistors which function to effect self-saturation for the magnetic amplifier.

Referring to Fig. 3, there is illustrated a self-saturating magnetic amplifier 40 in which self-saturation is produced by means of PNP transistors 42 and 44 which have applied thereto synchronous voltages. As illustrated, the PNP transistor 42 comprises a semiconductive body having an emitter electrode 46, a collector electrode 48, and a base electrode 50, all being in operative contact with the semiconductive body. On the other hand, the transistor 44 comprises a semiconductive body having an emitter electrode 52, a collector electrode 54, and a base electrode 56, all being in operative contact with the associated semiconductive body.

In this instance, the means for applying the synchronous voltages to the transistors 42 and 44 comprises a potential transformer 58 having a primary winding 60 and a secondary winding 62 having a center-tap 64. In particular, the base electrode 50 of the transistor 42 is connected to one end of the secondary winding 62, and the base electrode 56 of the transistor 44 is connected to the other end of the secondary winding 62 of the transformer 58. On the other hand, the collector electrode 48 of the transistor 42 is connected intermediate the upper end of the secondary winding 62, as illustrated, and the center-tap 64, while the collector electrode 54 of the transistor 44 is connected intermediate the lower end of the secondary winding 62, as illustrated, and the center-tap 64. In practice, energy for the secondary winding 62 is obtained by connecting the primary winding 60 to be energized from a source (not shown) of alternating voltage applied to terminals 66 and 66'.

As illustrated, the magnetic amplifier 40 also comprises magnetic core members 68 and 70, the magnetic core members being constructed from a saturable core material. In order to drive the magnetic core member 68 to saturation during alternate half-cycles of the alternating voltage applied to the terminals 66 and 66', a load winding 72 is disposed in inductive relationship with the magnetic core member 68. In like manner, in order to drive the magnetic core member 70 to saturation during the other alternate half-cycles of the alternating voltage applied to the terminals 66 and 66', a load winding 74 is disposed in inductive relationship with the magnetic core member 70.

For the purpose of energizing a load 76 in accordance with the magnetic flux level in the magnetic core member 68, the load winding 72 is connected in series circuit relationship with the load 76, one end of the series circuit being connected to the emitter electrode 46 of the transistor 42, and the other end of the series circuit being connected to the center-tap 64 of the transformer 58. On the other hand, in order to energize the load 76 in accordance with the magnetic flux level in the core member 70, the load 76 is likewise connected in series circuit relationship with the load winding 74, one end of the series circuit being connected to the center-tap 64 of the transformer 58, and the other end of the series circuit being connected to the emitter 52 of the transistor 44.

In order to reset the flux level of the magnetic core members 68 and 70 to a value as determined by the magnitude of the direct-current control voltage applied to the terminals 78 and 78', control windings 80 and 82 are disposed in inductive relationship with the magnetic core members 68 and 70, respectively. In particular, the control windings 80 and 82 are connected in series circuit relationship with one another, the series circuit being connected to the terminals 78 and 78'. It is to be noted that the control windings 80 and 82 are so disposed on their respective magnetic core members 68 and 70 that any voltage induced across the control windings 80 and 82, as effected by the current flow through the load windings 72 and 74, is cancelled substantially out.

The operation of the magnetic amplifier 40 will now be described. Assuming the polarity of the alternating voltage applied to the terminals 66 and 66' is such as to produce across the secondary winding 62 a voltage of a polarity as shown, current flows from the center-tap 64 of the secondary winding 62 through the load 76, the load winding 72, the emitter electrode 46 and collector electrode 48 of the transistor 42, to the point intermediate the upper end of the secondary winding 62, as illustrated, and the center-tap 64. Such an action drives the magnetic core member 68 to substantially complete saturation. During the same half-cycle of operation, the synchronous voltages are so applied to the transistor 44 that it is non-conductive.

During the next half-cycle of operation when the polarity of the voltage across the secondary winding 62 is such that the lower end of the secondary winding 62, as illustrated, is at a negative polarity with respect to its upper end, current flows from the center-tap 64 through the load 76, the load winding 74, and the emitter and collector electrodes 52 and 54, to the point intermediate the center-tap 64 and the lower end of the secondary winding 62, as illustrated. This current flow drives the magnetic core member 70 to substantially complete saturation. During this half-cycle of operation the synchronous voltages applied to the transistor 42 render it non-conductive.

As is customary, the current flow through the control windings 80 and 82 effects a resetting of the flux level in the respective magnetic core members 68 and 70 during that portion of the operation when their associated load winding is not conducting current.

It is to be understood that although PNP transistors 42 and 44 are incorporated in the magnetic amplifier 40 other types of transistors (not shown), such as NPN transistors could be substituted for the transistors 42 and 44. Such a substitution would be made in accordance with the circuit connections illustrated in Fig. 2. Also, it is preferred that junction type transistors be utilized for the transistors 42 and 44 of the magnetic amplifier 40; however, it is to be understood that other types, such as point contact type transistors, could also be utilized. It is also to be understood that other types of semiconductor devices having three or more electrodes can be substituted for the transistors shown and described herein to perform the functions described herein.

The magnetic amplifier 40 illustrated in Fig. 3 has several advantages. For instance, by utilizing the transistors 42 and 44 in combination with the remainder of the apparatus and in the predetermined manner illustrated, an extremely low power level signal applied to the terminals 78 and 78' can be properly amplified. This is brought about since the transistors 42 and 44 are capable of rectifying supply voltages of extremely low amplitude. Such being the case, the size of the magnetic core members 68 and 70 can be minimized. Therefore, a low level power signal applied to the terminals 78 and 78' is capable of effecting a resetting of the flux level of the magnetic core members 68 and 70 over a suitable operating range. Further, by minimizing the size of the magnetic core members 68 and 70 a minimum response time is obtained for the magnetic amplifier 40.

In addition, by utilizing the transistors 42 and 44 and interconnecting them in the circuit, as illustrated, the magnetic amplifier 40 is capable of properly operating at a relatively high ambient temperature.

Since numerous changes may be made in the above described circuits and apparatus, and since different embodiments of the invention may be made without departing from the spirit and scope thereof, it is intended that all of the matter contained in the foregoing description or shown in the accompanying drawing shall be interpreted as illustrative and not in a limiting sense.

I claim as my invention:

1. In a self-saturating magnetic amplifier for supplying energy to a load, the combination comprising, a magnetic core member, a load winding disposed in inductive relationship with the magnetic core member, a transistor comprising a semiconductive body having an emitter electrode, a collector electrode, and a base electrode all in operative contact therewith, means, interconnected with the load and with the load winding, for providing two synchronous alternating voltages, circuitry connecting said means to the collector electrode and to the emitter electrode so that one of the synchronous alternating voltages is applied between the collector electrode and the emitter electrode, other circuitry connecting the said means to the collector electrode and to the base electrode so that the other synchronous alternating voltage is applied between the collector electrode and the base electrode, the instantaneous polarity of said two synchronous alternating voltages during alternate half-cycles being such that the base electrode is positive with respect to the collector electrode and with respect to the emitter electrode, whereby the transistor during said alternate half-cycles prevents current from flowing through the load winding and the load, and control means, including a control winding disposed in inductive relationship with the magnetic core member, for controlling the flux level in the magnetic core member.

2. In a self-saturating magnetic amplifier for supplying energy to a load, the combination comprising, magnetic core means, two load windings disposed in inductive relationship with the magnetic core means, two transistors, each comprising a semiconductive body having a collector electrode, an emitter electrode, and a base electrode all in operative contact therewith, means, interconnected with the load and with the two load windings, for providing four synchronous alternating voltages, circuitry connecting said means to the collector electrode and the emitter electrode of each of the two transistors so that one of the synchronous alternating voltages is applied between the collector electrode and the emitter electrode of one of the two transistors and so that another of the synchronous alternating voltages is applied between the collector electrode and the emitter electrode of the other of the two transistors, other circuitry for connecting said means to the collector electrode and the base electrode of each of the two transistors so that one of the remaining synchronous alternating voltages is applied between the collector electrode and the base electrode of said one of the two transistors and so that the other of the remaining synchronous alternating voltages is applied between the collector electrode and the base electrode of said other of the two transistors, the instantaneous polarity of the four synchronous alternating voltages being such that when the base electrode of the said one of the two transistors is positive with respect to its associated collector and emitter electrode, the base electrode of the said other of the two transistors is negative with respect to its associated collector and emitter electrode, whereby said two transistors alternately conduct current and thus permit current to alternately flow through said two load windings, and a control winding disposed in inductive relationship with the magnetic core means for controlling the flux level in the magnetic core means.

References Cited in the file of this patent

UNITED STATES PATENTS

| | | |
|---|---|---|
| 2,516,563 | Graves | July 25, 1950 |
| 2,620,448 | Wallace | Dec. 2, 1952 |
| 2,686,290 | Macklem | Aug. 10, 1954 |

FOREIGN PATENTS

| | | |
|---|---|---|
| 684,626 | Great Britain | Dec. 24, 1952 |